(12) United States Patent
Chou et al.

(10) Patent No.: US 7,917,793 B2
(45) Date of Patent: Mar. 29, 2011

(54) APPARATUS PROVIDING LOCALLY ADAPTIVE RETIMING PIPELINE WITH SWING STRUCTURE

(75) Inventors: Shu-Hsuan Chou, Chia-Yi (TW); Yi-Chao Chan, Chia-Yi (TW); Ming-Ku Chang, Chia-Yi (TW); Tien-Fu Chen, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 0 days.

(21) Appl. No.: 12/068,751

(22) Filed: Feb. 11, 2008

(65) Prior Publication Data

US 2010/0287400 A1 Nov. 11, 2010

(51) Int. Cl.
*G06F 1/12* (2006.01)
*G06F 1/04* (2006.01)
*H03K 19/00* (2006.01)
*H03L 7/00* (2006.01)
*H04L 7/00* (2006.01)
*G06F 7/52* (2006.01)
*G06F 9/30* (2006.01)

(52) U.S. Cl. .......... 713/400; 713/600; 326/93; 327/141; 375/354; 708/631; 712/219

(58) Field of Classification Search .................. 713/400, 713/600; 708/631; 712/219; 326/93; 327/141; 375/354

See application file for complete search history.

(56) References Cited

U.S. PATENT DOCUMENTS

| 6,167,529 | A  | * | 12/2000 | Dalvi ............................ 713/501 |
| 6,958,627 | B2 | * | 10/2005 | Singh et al. ...................... 326/93 |
| 7,278,080 | B2 | * | 10/2007 | Flautner et al. ................ 714/746 |
| 7,406,588 | B2 | * | 7/2008  | Lin et al. ........................ 712/219 |
| 7,409,027 | B1 | * | 8/2008  | Sudjian .......................... 375/374 |

\* cited by examiner

*Primary Examiner* — Stefan Stoynov
(74) *Attorney, Agent, or Firm* — Jackson IPG PLLC; Demian K. Jackson (57) ABSTRACT

The present invention uses a swing structure to avoid using a clock period at a non-efficient execution time. The execution time is precisely controlled to enhance a performance of a processor using a low voltage. Thus, synchronization problems in a chip under different environments are solved for high reliability.

5 Claims, 8 Drawing Sheets

APPARATUS PROVIDING LOCALLY ADAPTIVE RETIMING PIPELINE WITH SWING STRUCTURE

FIELD OF THE INVENTION

The present invention relates to a locally adaptive retiming pipeline; more particularly, relates to optimizing an integrated circuit with a swing structure.

DESCRIPTION OF THE RELATED ARTS

In the recent years, mobile and portable devices are widely used.

Performance of embedded systems becomes essential for supporting multiple services, such as 3D graphic, video/audio, etc. However, increasing in complexity and operation frequency causes a limitation on battery capacity and some significant thermal problems. Hence, important challenges to embedded systems include high reliability, low power, and high performance under different environments. Scaling to a low voltage is an efficient low-power solution; however, it causes unacceptable latency delay and significant reliability problems. The impact factors of low voltage on processor designs include:

(1) Owing to long wire delay, it is difficult to have global signaling and synchronization for controlling processor, like forwarding, hazard detection, and interrupt.

(2) Noise delay implication, including crosstalk, power distribution and IR drop, has more and more impact on a deep-submicron design.

(3) Clock skew problem is serious in a large processor design. It not only causes performance loss but also have some meta-stability problems reducing reliability.

Recently, GALS design (globally asynchronous locally synchronous) is proposed for the low-voltage processor design in order to tolerate interconnection delay, noise delay, clock skew, etc. by using minimal-delay handshakes.

A Razor's methodology is used in a new approach to dynamic voltage scaling (DVS) in the low-power processor design. It is a tolerance approach for critical path to keep performance in a low-voltage environment. Razor's flip-flop uses double-samples pipeline stage values, one with a fast clock and another with a time-borrowing delayed clock. Yet, short path and meta-stability problems are included in the Razor's methodology. There are some solutions provided:

(1) A number of registers on the latency-constrained path are increased while preserving functionality and latency of a circuit. It is done by using a negative-edge trigger D flip-flop, which is implemented for pre-computation and prediction.

(2) An appended logic, or, to say, a hold logic, is used to detect whether the computation time of a current input pattern exceeds a timing constraint. When the hold logic is asserted, one cycle is taken to finish a computation. Otherwise, when the hold logic is de-asserted, the computation is performed in two cycles. Given the timing constraint less than the critical path delay, a performance gain is obtained while a probability of taking two cycles for computation is low.

Significant research is currently underway to develop methodologies for integrating GALS into mainstream microprocessors and systems on chip (SOC). A novel deterministic GALS is invented. Wrappers around synchronous blocks keep a system globally asynchronous while ensuring that, even some do not arrive at a deterministic time, each transition is sensed by the synchronous block during a deterministic cycle of the local clock.

However, a low voltage not only means a low power, but also means unbearable low performance and low reliability. Therein, the lower performance is formed because of clock period dominated by critical-path delay. And the low reliability comes from instability under the low voltage. Hence, the prior arts do not fulfill all users' requests on actual use.

SUMMARY OF THE INVENTION

The main purpose of the present invention is to use a swing structure to avoid utilizing a clock period at a non-efficient execution time and thus to enhance a performance of a low-voltage processor by precisely controlling the execution time and to solve synchronization problems in a chip under different environments for obtaining high reliability.

To achieve the above purpose, the present invention is an apparatus providing a locally adaptive retiming pipeline with a swing structure, comprising a combinational block as an input of bit data; a dual-track flip-flop connected with the combinational block, where the dual-track flip-flop has a swing data path and is driven by a positive-edge or negative-edge clock signal to obtain calculated data with interlaced clock triggers; a data-flow coordinator connected with the dual-track flip-flop, where the data-flow coordinator receives execution time prediction, controls internal data-path, and swings the calculated data to the dual-track flip-flop; and a detection logic unit connected with the combinational block and the data-flow coordinator, where the detection logic unit obtains execution time prediction, swings data to a flip-flop of the dual-track flip-flop, and obtains multiple execution time by the interlaced clock triggers. Accordingly, a novel apparatus providing a locally adaptive retiming pipeline with a swing structure is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
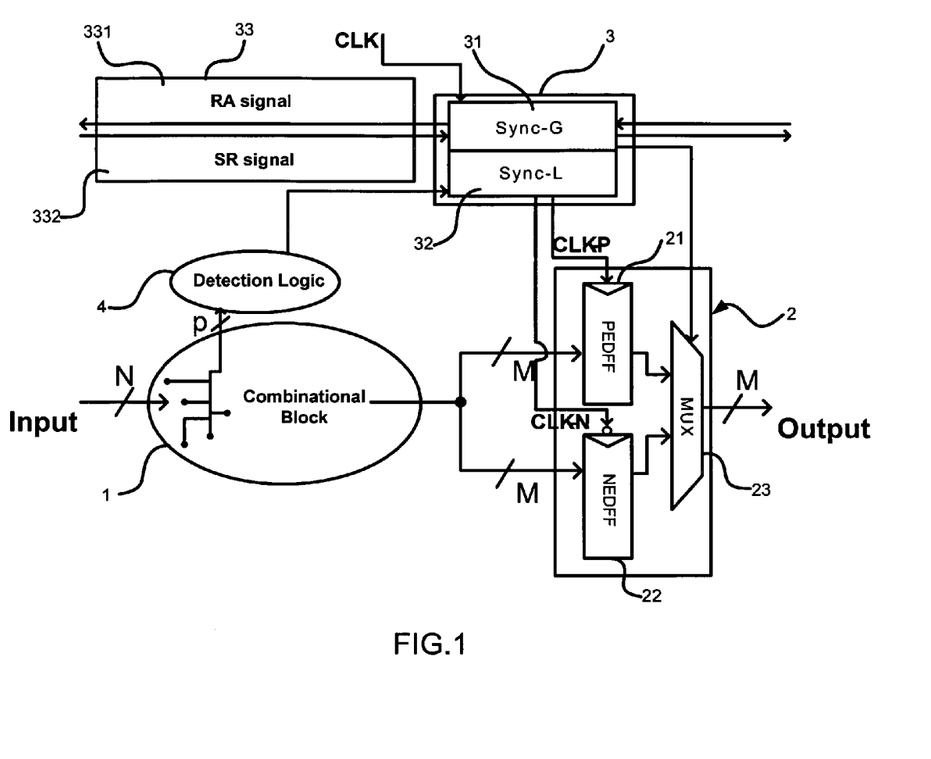
FIG. 1 is the structural view showing the preferred embodiment according to the present invention.

Please refer to FIG. 1, which is a structural view showing a preferred embodiment according to the present invention. As shown in the figure, the present invention is an apparatus providing a locally adaptive retiming pipeline with a swing structure, comprising a combinational block 1, a dual-track flip-flop 2, a data-flow coordinator and a detection logic unit 4.

The combinational block 1 is an input of bit data to be calculated.

The dual-track flip-flop 2 is connected with the combinational block 1, which has a swing data path and is driven by a positive-edge or negative-edge clock signal (CLK_P or CLK_N) to obtain calculated data with interlaced clock triggers. Therein, the dual-track flip-flop 2 comprises a positive-edge D flip-flop (PEDFF) 21, a negative-edge D flip-flop (NEDFF) and a multiplexer (MUX) 23.

The data-flow coordinator 3 is connected with the dual-track flip-flop 2 for dynamically adaptive retiming, where execution time prediction is received; internal data-paths are controlled; and calculated data are swung to the dual-track flip-flop 2. Therein, the data-flow coordinator 3 comprises a distributed global data-flow controller 31 and a local data-flow controller 32; and, the data-flow coordinator 3 is connected with an outer communication interface 33 to transfer a circling handshake, comprising a ready-to-accept (RA) output signal 331 and a signal-received (SR) input signal 332, for synchronization with outside environment.

The detection logic unit 4 is connected with the combinational block 1 and the data-flow coordinator 3 to provide information for deciding which flip-flop in the dual-track flip-flop 2 is the transferred data swung to. Besides, multiple execution times are formed by interlaced clock triggers, such as clock periods of 0.5, 1.0, 1.5, 2.0, etc. Thus, with the above structure, a novel apparatus providing a locally adaptive retiming pipeline with a swing structure is obtained.

Figure 2:
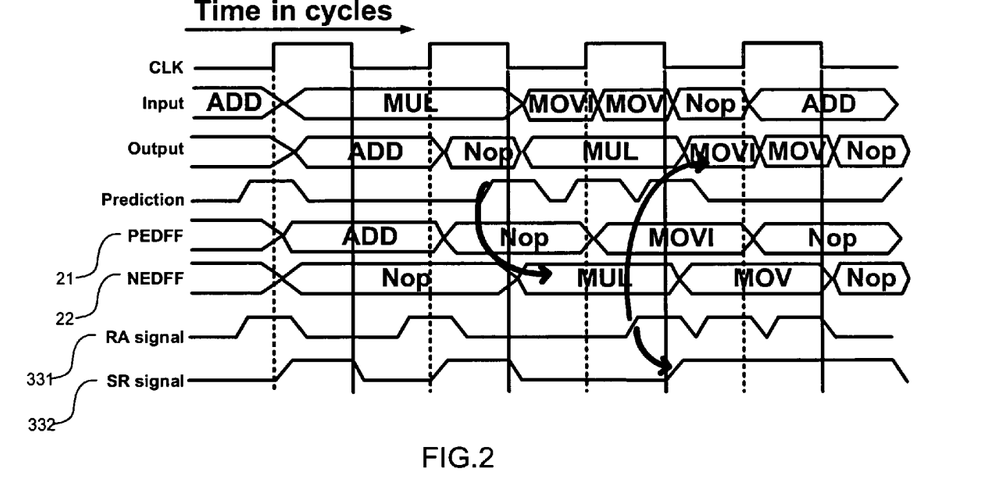
FIG. 2 is the view showing timing diagram in the locally adaptive retiming block.

Please refer to FIG. 2 to FIG. 8, which are a view showing timing in a timing diagram of locally adaptive retiming block; a view showing a synchronization chain tolerating a signal propagation delay; a view showing swinging in a dual-track flip-flop by processing different instructions; a view showing an adaptive retiming example; a structural view showing a swing structure communication interface; a view showing timing example in the swing structure communication interface; and a view showing an integration of a locally adaptive retiming pipeline architecture in a low-voltage processor. As shown in the figures, a processor has a design comprising several areas, such as a sectioned pipeline. The areas are called dynamically adaptive retiming blocks as shown in FIG. 1, where different execution times are obtained to correspond to different inputs. Hence, a detection logic unit 4 is used to decide execution times for the inputs. And multiple adaptive clock-period retiming is used to tolerate longer execution time, as shown in FIG. 2. Consequently, execution times of circuit under different inputs are well utilized and a single clock period is enough for a whole system.

Structural components shown in FIG. 1 are listed along a longitudinal axis shown in FIG. 2. Instructions shown in FIG. 2 are MUL, MOVI, MOV and ADD. Execution times of the instructions are obtained through prediction signals from signal lines, which are generated by the detection logic unit 4. Such as, the execution time for the MUL instruction is 0.5 clock period; the execution times for the MOVI and the MOV instructions are 0.5 clock period separately; and the execution time for the ADD instruction is 1.0 clock period. On receiving the prediction signals of the signal lines, data paths are controlled to be directed to a PEDFF or a NEDFF of a dual-track flip-flop 2 by a data-flow coordinator 3. And calculated data are outputted to output ports of the signal lines, where output decisions are made through a handshake comprising an RA output signal 331 and an SR input signal 332 from a communication interface 33. On executing the MUL instruction, a longer execution time is required so that 0.5 clock period of NOP (non operation) status appears at the output port of the signal line. Thus, the output port of the signal line has no output before the MUL instruction is finished. On executing the MOVI instruction, the RA output signal 331 is asserted showing that a neighboring block is ready to receive new data. During the following half clock period, the MOVI instruction is outputted to the output port of the signal line. And, the SR input signal 332 is asserted with a signal transferred from the neighboring block for showing that the data is received. Thus, the handshake is finished.

In the present invention, multiple arithmetic pipeline stages are made into multiple dynamically adaptive retiming blocks to be connected through a handshake mechanism. And the locally adaptive retiming blocks are linked into a synchronization chain for smoothing the whole execution, where signals are transferred until available time is run out; and no execution error appears at the processor even when time is insufficient for transferring a signal.

Figure 3:
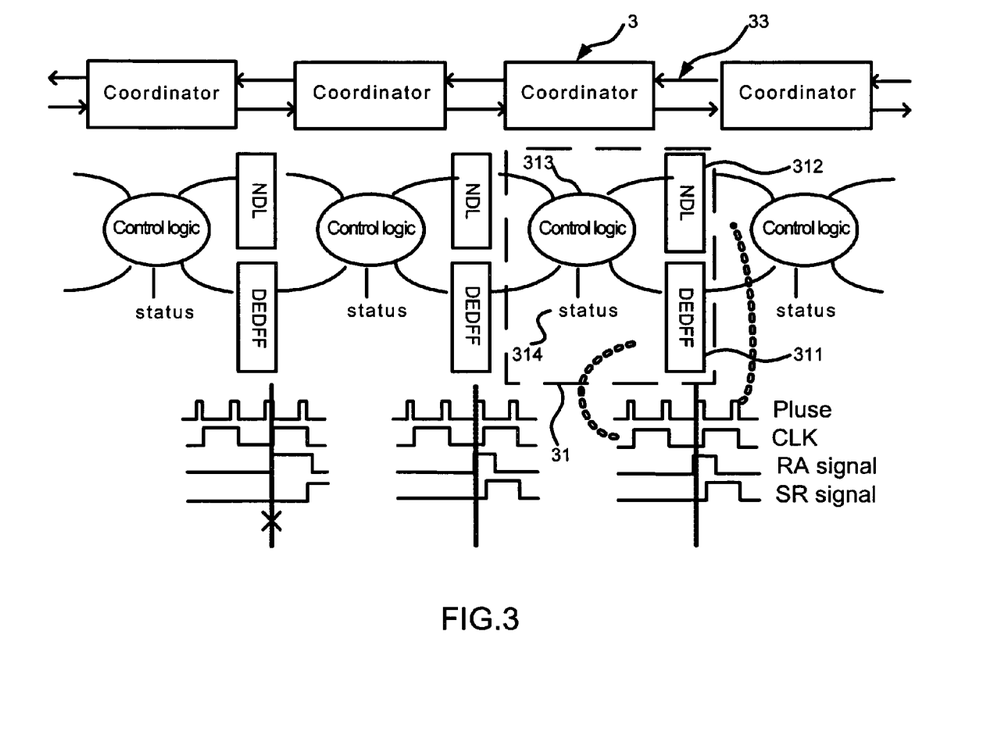
FIG. 3 is the view showing the synchronization chain tolerating the signal propagation delay.

As shown in FIG. 3, the four data-flow coordinators 3, also named dynamically adaptive retiming blocks, are connected through a handshake. Therein, a distributed global data-flow controller 31 (Sync-G) is used for synchronization control; is connected with the communication interface; and comprises a double-edge trigger D flip-flop (DEDFF) 311, a negative-edge D-latch (NDL) 312 and a control logic unit 313. The NDL 312 is driven by a pulse signal 315 to receive an RA output signal from a neighboring block. With the NDL 312 and the pulse signal 315, a locking phase is obtained to stop receiving unstable RA output signals 331. Thus, if a transference exceeds the locking phase, data is tried to be transferred again to prevent exceeding transference delay under a low voltage. The control logic unit 313 is used to receive an RA output signal 331, an SR input signal 332 from the neighboring block, and a status signal 314; and to send an RA output signal 331 and an SR input signal 332 to the neighboring block or the DEDFF 311 to finish the handshake. If the control logic unit 313 sends the RA output signal 331 yet no corresponding SR input signal 332 is received, the RA output signal 331 is resent again at next half cycle, which is the main idea of the handshake mechanism. The DEDFF 311 receives the SR input signal 332 from the control logic unit 313 and the SR input signal 332 is then transferred to the neighboring block through the DEDFF 311. Thus, the SR input signal 332 has a half clock period delay on transferring.

As shown in FIG. 3 example, a first RA output signal 331 is sent to be received without exceeding the locking phase. Then an SR input signal 332 is responded at the following half clock period. A second RA output signal 331 is then sent under the same situation. Hence, two pipeline stages are passed by transferring the two RA output signals. Then a third RA output signal 331 is tried to be sent, yet the locking phase is exceeded with an overtime transference delay. Consequently, the third RA output signal 331 is neither received nor the corresponding SR input signal 332 is sent at the following half clock period, which means a bubble (or NOP) is formed. Because the RA output signal 331 is sent yet the corresponding SR input signal 332 is not received, the block sends the RA output signal 331 again and confirms on receiving the corresponding SR input signal 332 at the following half clock period for ensuring correct data received and execution times synchronized between different blocks. In this way, a bubble may be formed when overtime transference delay happens, but a tolerance for instability under a low voltage greatly enhances reliability of the processor with the structure according to the present invention.

Figure 4:
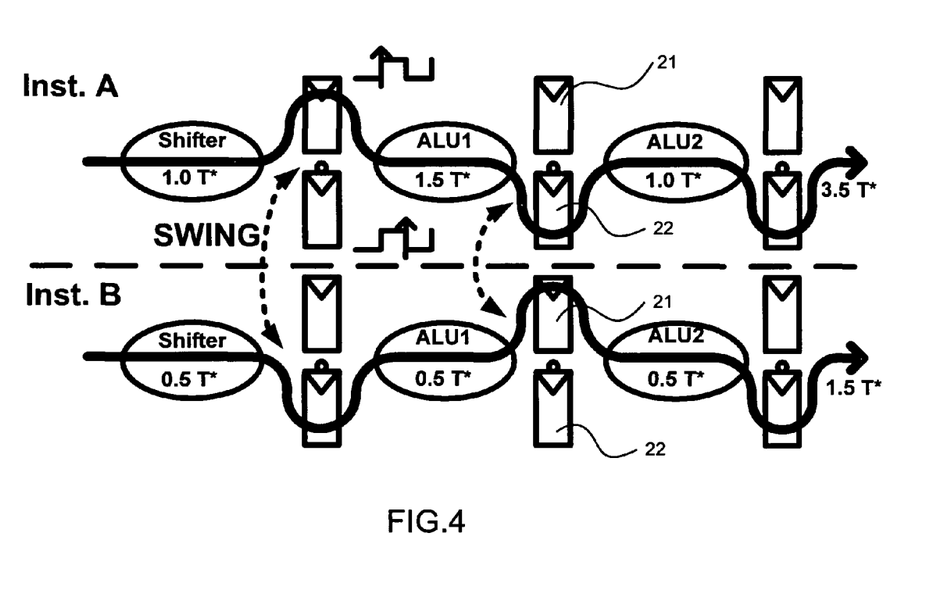
FIG. 4 is the view showing the swinging in the dual-track flip-flop by processing different instructions.
Figure 5:
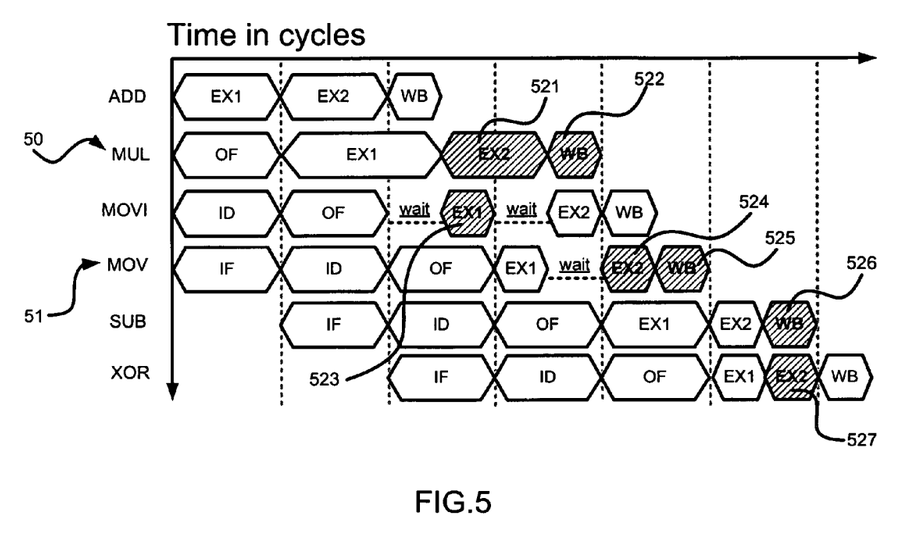
FIG. 5 is the view showing the adaptive retiming example.

As shown in FIG. 4 and FIG. 5, the detection logic unit 4 is used in the swing structure to predict execution time for swinging to the positive-edge D flip-flop 21 or the negative-edge D flip-flop 22 of the dual-track flip-flop 2. Thus, multiple execution times of clock periods of 0.5, 1.0, 1.5, etc. are driven by positive and negative clock trigger. Therein, the MUL instruction 50 uses 1.5 clock period in EX1 pipeline stage and the MOV 51 uses only 0.5 clock period. Yet resource conflicts may happen owing to different execution times. When the detection logic unit 4 obtains a prediction of 1.5 clock period for the MUL instruction 50, the data path is swung to the negative-edge D flip-flop 22 of the dual-track flip-flop 2 for increasing or decreasing execution time, which dynamically adjusts execution time as shown in the first execution blocks 521~527 swung to the negative-edge D flip-flop 22 of the dual-track flip-flop 2 in FIG. 5. Conclusively, the present invention uses the swing structure to reduce a number of cycles for the whole execution and thus a better execution performance is obtained.

The detection logic unit 4 used in the present invention predicts delay to replace an original pipeline with the dual-track flip-flop 2. The dual-track flip-flop 2 and the data-flow coordinator 3 are combined to obtain a dynamically adaptive retiming structure, where predicted execution time is used to adjust path dynamically for utilizing time effectively and a problem of meta-stability is thus solved. The dual-track flip-flop 2 is driven by positive-edge or negative-edge clock signal to obtain calculated data with interlaced clock triggers. Considering a low power, the interlaced clock trigger for the positive-edge or negative-edge clock signal is functioned only when required. The dual track structure of the dual-track flip-flop 2 provides an extra place to effectively and dynamically adjusting execution time for a better performance. As shown in FIG. 1, four clock periods of 0.5, 1.0, 1.5 and 2.0 are predicted by the detection logic unit 4; and thus paths are handled by the data-flow coordinator 3.

The local data-flow controller (Sync-L) 32 is responsible for dynamically adjusting execution time, where internal data-path is controlled and execution time prediction is received. On finishing execution, clock trigger for the positive-edge or negative-edge clock signal is obtained to swing to the positive-edge D flip-flop 21 or the negative-edge D flip-flop 22 of the dual-track flip-flop 2. And the distributed global data-flow controller 31 is responsible for communications between the communication interface 33 and the other dynamically adaptive retiming blocks.

Figure 6:
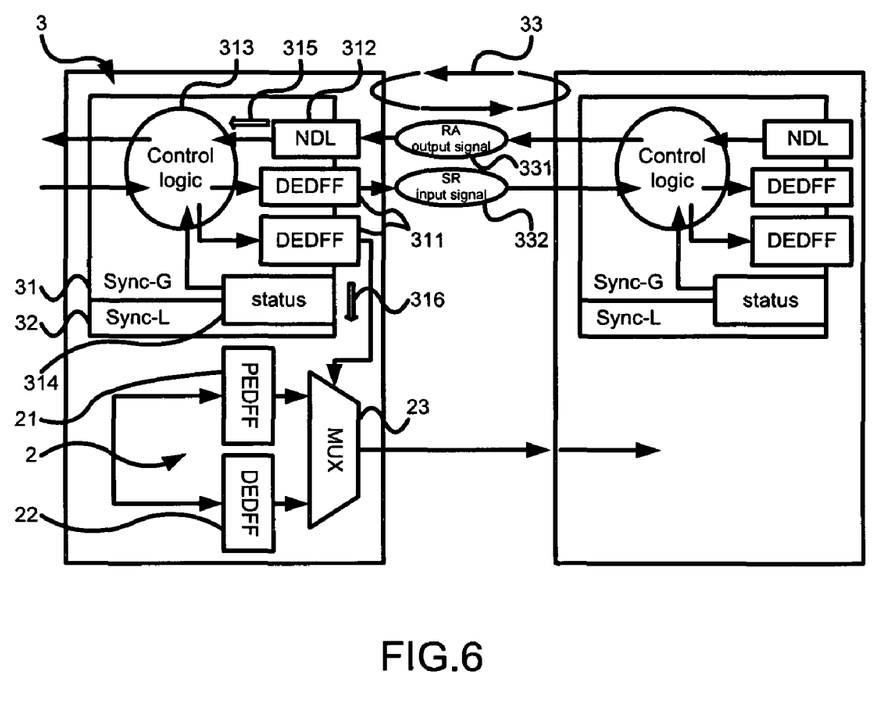
FIG. 6 is the structural view showing the swing structure communication interface.
Figure 7:
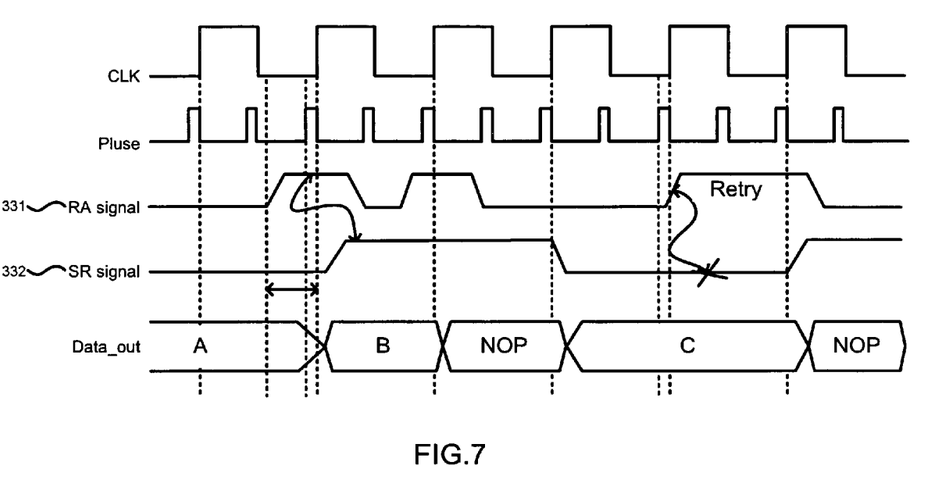
FIG. 7 is the view showing the timing diagram in the swing structure communication interface.

Besides, the communication interface 33 is used in the present invention for the synchronizations between the dynamically adaptive retiming blocks for effectively tolerating delay in environments having big variations, which is a concept of GALS. To solve the synchronization problem between the dynamically adaptive retiming blocks and to stabilize reliability factors under a low voltage, blocks are isolated and the communication interface 33 is provided for connecting the blocks in between. The communication interface 33 comprises the DEDFF 311 and the NDL 312, which transfers signals rapidly; tolerates signal propagation errors with a locking phase to ensure reliability; and is thus suitable for a processor having a GALS design tolerating time delay of global data transference in an embedded low-voltage system. As shown in FIG. 6 and FIG. 7, the communication interface 33 links the locally adaptive retiming blocks into a synchronization chain for smoothing execution. Signals are transferred until time is run out. When time is insufficient, no error appears at the processor and the signal is resent again to the original destination node at the following execution time. Thus, the present invention tolerates a longer signal delay or loss to environment changes with the synchronization chain. Further, signal is resent again to enhance reliability of the communications between the locally adaptive retiming blocks, where a signal delay or loss is detected by the communication mechanism with the signal resent again.

As shown in FIG. 6, NDL 312 is coordinated with the pulse signal 315 to form a locking phase for avoiding receiving unstable RA output signals 331. The control logic unit 313 is responsible for receiving RA output signals 331, SR input signals 332 and status signals 332 from a neighboring block and correspondingly sending RA output signals 331 and SR input signals 332 to another neighboring block or DEDFF 311 to finish the handshake of the communication interface 33. If the control logic unit 313 sends an RA output signal but no corresponding SR input signal 332 is received at the following half clock period, a transference delay exceeds the locking phase and the RA output signal is sent again. The control logic unit 313 is responsible for controlling outside synchronization by accessing the RA output signal, which is done through the MUX after the dual-track flip-flop. The DEDFF 311 is responsible for receiving the SR input signal 332 sent from the control logic unit 313. And the SR input signal 332 is then transferred to the neighboring block through the DEDFF 311. Thus, the SR input signal 332 has a half clock period delay on transferring. And the pulse signal 315 is combined with the clock signal 316 to obtain a locking phase.

As shown in FIG. 7, when the RA output signal 331 is stabilized before the locking phase, the handshake mechanism is fulfilled and the signal is safely transferred. Yet, when the RA output signal 331 is stabilized after the locking phase, the handshake mechanism is failed and, because the SR input signal 332 is not received, the RA output signal 331 is resent again at the following half clock period.

Figure 8:
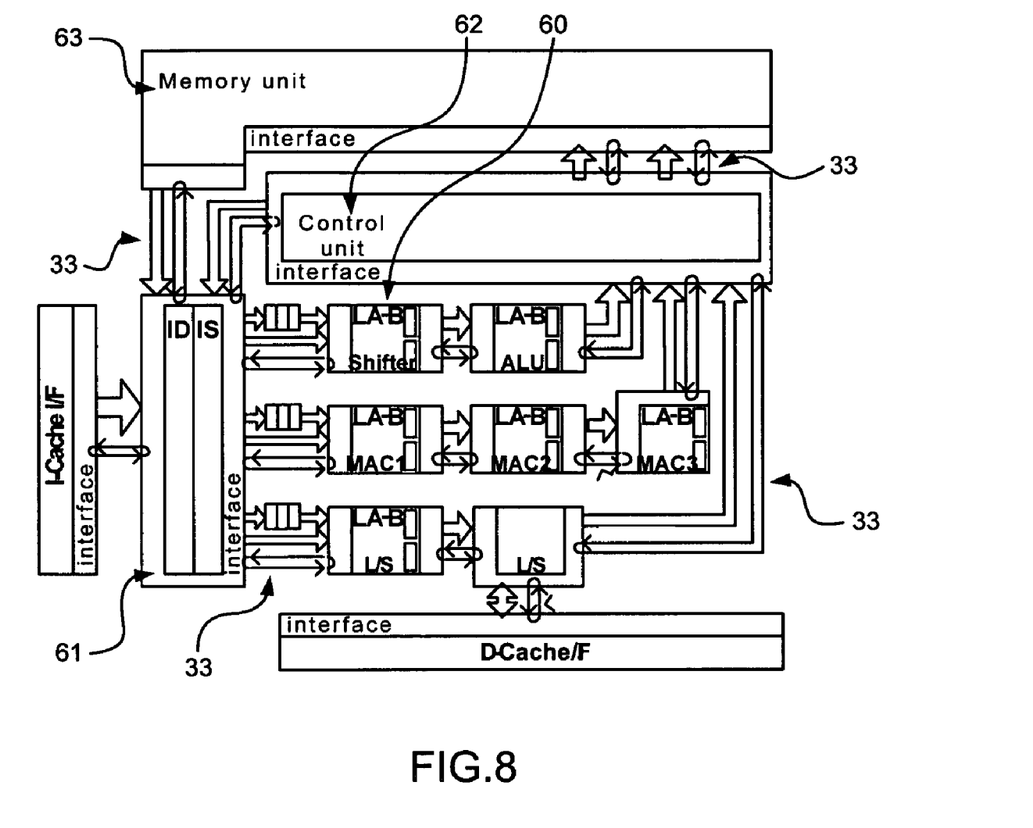
FIG. 8 is the view showing the integration of the locally adaptive retiming pipeline architecture in the low-voltage processor.

As shown in FIG. 8, the present invention is integrated into a low-voltage processor, comprising locally adaptive retiming blocks 60, a fixed execution time 61, a control logic unit 62, a memory unit 63 and communication interfaces 64. In the processor, all blocks are packaged into isolated blocks with communication interface wrappers to be controlled by a handshake mechanism; and a high reliability and a high performance are obtained with the swing structure under a low voltage according to the present invention.

Accordingly, the present invention has the following advantages:

1. The present invention constructs dynamically adaptive retiming blocks by using dual-track flip-flops to utilize timing precisely for improving overall performance.

2. The present invention is combined with a detection logic to manage data path in advance for minimizing error-tolerance recover overhead.

3. With the dynamically adaptive retiming blocks obtained by using dual-track flip-flops, the present invention has no meta-stability problem.

4. The present invention provides a circle-handshaking distributed control for synchronization to solve synchronization problems in unstable environments and thus to obtain a high reliability.

To sum up, the present invention is an apparatus providing a locally adaptive retiming pipeline with a swing structure, where dynamically adaptive retiming blocks are integrated with a circle-handshaking distributed control to obtain a low-voltage processor having high performance and reliability.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus providing a locally adaptive retiming pipeline with a swing structure, comprising:
    a combinational block, said combinational block being an input of bit data;
    a dual-track flip-flop, said dual-track flip-flop connecting to said combinational block, said dual-track flip-flop having a swing data path, said dual-track flip-flop being driven by an edge clock signal to obtain calculated data with interlaced clock triggers, said edge clock signal being selected from a group consisting of a positive-edge clock signal and a negative-edge clock signal;
    a data-flow coordinator, said data-flow coordinator connecting to said dual-track flip-flop, said data-flow coordinator receiving execution time prediction, said data-flow coordinator controlling internal data-path, said data-flow coordinator swinging said calculated data to said dual-track flip-flop; and
    a detection logic unit, said detection logic unit connecting to said combinational block and said data-flow coordinator, said detection logic unit obtaining execution time prediction, said detection logic unit swinging data to a flip-flop of said dual-track flip-flop, said detection logic unit obtaining multiple execution time through said interlaced clock triggers.

2. The apparatus according to claim 1,
wherein said dual-track flip-flop comprises a positive-edge D flip-flop, a negative-edge D flip-flop and a multiplexer 3. The apparatus according to claim 1,
wherein said data-flow coordinator comprises a distributed global data-flow controller and a local data-flow controller.

4. The apparatus according to claim 1,
wherein said data-flow coordinator connects to a communication interface.

5. The apparatus according to claim 4,
wherein said communication interface transfers a ready-to-accept (RA) output signal and a signal-received (SR) input signal.

* * * * *